United States Patent [19]
Kelch

[11] 3,953,720
[45] Apr. 27, 1976

[54] ELECTRONIC TAXIMETER FOR TAXIS TAKING A PLURALITY OF PASSENGERS ON OVERLAPPING TRIPS

[75] Inventor: Heinz Kelch, Buchenberg, Germany

[73] Assignee: Kienzle Apparate GmbH, Villingen, Germany

[22] Filed: June 25, 1974

[21] Appl. No.: 483,065

[30] Foreign Application Priority Data
June 26, 1973 Germany............................ 2332361

[52] U.S. Cl.............................. 235/168; 235/30 R; 235/92 TC
[51] Int. Cl.² .................... G06F 13/00; G06F 13/04
[58] Field of Search............... 235/168, 92 TC, 30 R

[56] References Cited
UNITED STATES PATENTS

| | | |
|---|---|---|
| 3,512,706 | 5/1970 | Bruce-Sanders ................. 235/30 R |
| 3,764,782 | 9/1973 | Spauszus et al. ................ 235/92 TC |
| 3,818,186 | 6/1974 | Harwood ........................... 235/30 R |
| 3,843,874 | 10/1974 | Kelch ........................... 235/92 TC X |
| 3,860,806 | 1/1975 | Fichter et al. ...................... 235/168 |
| 3,860,807 | 1/1975 | Fichter et al. ...................... 235/168 |

Primary Examiner—David H. Malzahn
Attorney, Agent, or Firm—Michael J. Striker

[57] ABSTRACT

A single taxi is provided with an electronic taximeter which includes fare computing circuitry operative for separately computing the fares of a plurality of passengers whose respective trips overlap. A fare display device is operative for displaying the computed fares associated with the respective passengers. A coordinating arrangement is activatable for initiating computation of the fare associated with a respective passenger when such passenger enters the taxi and is furthermore activatable for terminating the computation of the respective fare when the respective passenger leaves the taxi.

12 Claims, 12 Drawing Figures

ELECTRONIC TAXIMETER FOR TAXIS TAKING A PLURALITY OF PASSENGERS ON OVERLAPPING TRIPS

CROSS-REFERENCE TO RELATED APPLICATION

Disclosed herein are taximeters whose operation is in many respects similar to the operation of the taximeter disclosed in commonly owned copending U.S. patent application Ser. No. 323,908 of Manfred Fichter et al., filed Jan. 19, 1973 and now U.S. Pat. No. 3,860,806, entitled "ELECTRONIC TAXIMETER HAVING INTERCHANGEABLE CONSTANT FURNISHING MEANS", the entire disclosure of which is incorporated herein by references.

BACKGROUND OF THE INVENTION

The invention relates to electronic taximeters, and more particularly to an electronic taximeter which meets the requirements of taxis operating as shuttles or mini-buses and sometimes carrying a single passenger but sometimes a plurality of passengers whose respective trips overlap.

It has been statistically established that ordinary taxis predominantly carry only a single passenger at any one time. However, from the view point of the taxi owner, and also to reduce traffic congestion and air pollution, it is very desirable, especially in large cities, to change over from the old single-passenger taxi system to systems in which taxis serve as shuttles or mini-buses, or in which in general the taxis to the extent possible carry concurrently a plurality of passengers, often on respective trips which overlap. In general, it would be desirable to utilize to the extent possible the entire seating capacity of the taxi passenger compartment, by carrying as many passengers as possible, even to different destinations, so long as the different destinations are not too far from each other.

Japanese patent publication No. 32 997-70 discloses a taximeter arrangement for use in taxis operating on the shuttle or mini-bus basis. The disclosed arrangement consists essentially of two fare calculators and fare indicators. The first fare calculator and the first fare indicator are employed when only a single passenger rides the taxi. When two passengers share the taxi, the second fare calculator and the second fare indicator are employed. Selector switches are provided to activate one or the other of the two devices.

This prior-art taximeter arrangement is rather complicated and, more importantly, does not individually indicate the computed fare for each passenger when the trips of the respective passengers overlap. In addition, the known prior-art arrangement is inherently space-consuming. This is a very significant disadvantage, because the dashboard space of a taxi is generally quite limited, especially in the case of radio-dispatched taxis where the radio equipment itself consumes a great deal of the dashboard space.

SUMMARY OF THE INVENTION

One object of the invention is to provide a taximeter arrangement for taxis operating as shuttles, mini-buses, or in other manner such that they will often concurrently carry a plurality of passengers whose respective trips overlap.

This object, and others which will become understandable from the detailed description, below, of specific embodiments, can be met, according to one advantageous concept of the invention, by providing, in a single taxi, an electronic taximeter comprising, in combination, fare computing means operative for separately computing the fares of a plurality of passengers whose respective trips overlap, fare display means operative for displaying the computed fares associated with the respective passengers, and coordinating means activatable for initiating computation of the fare associated with a respective passenger when such passenger enters the taxi and activatable for terminating the computation of the respective fare when the respective passenger leaves the taxi.

This system permits a relatively simple computation by electronic computer circuitry of the fare for each passenger, separately, in dependence upon the actual distance travelled by such passenger, and without any confusion, no matter whether such passenger is the last of the plurality of passengers to leave the taxi, no matter whether such passenger rides alone or is accompanied by others, and if accompanied by others no matter what the order in which the various passengers enter and leave the taxi.

According to one advantageous concept of the invention, the taximeter is provided with a plurality of coordination keys inserted into respective keyholes in the taximeter. The coordination keys can for example be of different color. When a passenger enters the taxi, the taxi driver pulls one of the coordination keys out of the taximeter and gives the key to the passenger. The removal of the key from the taximeter initiates computation of the fare for such passenger. The use of a coordination key is simpler than the use of seat contacts to establish the coordination between the different fares being simultaneously computed and the different passengers being concurrently carried. When the destination of a particular passenger is reached, the passenger pays the fare indicated on the meter and returns the key to the taxi driver. The taxi driver reinserts the coordination key into the respective keyhole, thereby terminating computation of the fare associated with such passenger, and the passenger then leaves the taxi. This system forces the taxi driver to hold to the operating regulations, because only by withdrawing a coordination key and then later reinserting such key can he obtain a fare computation and indication.

The use of coordination keys, as compared to the use of seat contacts which coordinate different fare computations with the occupancy of different seating locations, is advantageous in further respects. The difficulty arising when a passenger moves from one side of the passenger compartment to another is entirely eliminated. Moreover, each passenger holds his respective coordination key in his hand, giving him a feeling of confidence that there will be no mix-up concerning the relationship between himself and the fare associated with him when it comes time to pay, no matter how many other passengers have entered and left the taxi during his trip.

However, although the use of coordination keys can supplant the use of seat contacts for this purpose, seat contacts can of course be used for other purposes if desired, for example to generate a reminder signal in the event the taxi driver forgets to give his passenger a coordination key.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
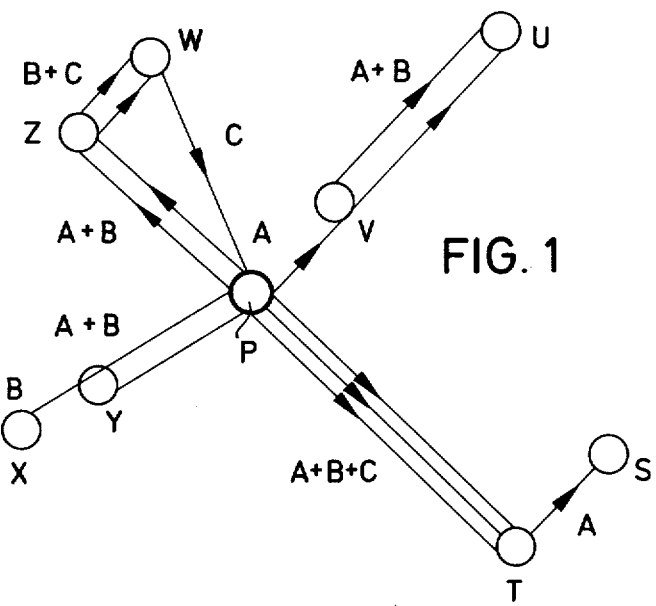
FIG. 1 depicts graphically routes taken by a shuttle-type taxi.

FIG. 1 is provided to explain the principles of a taxi shuttle system of the general type under consideration. Point P represents, for example, the main railroad station of a large city. Different taxi passengers arrive by train at the railroad station, and then wish to be driven by taxi in essentially four or five different directions. For example, the passengers A and B may respectively wish to be taken from railroad station P to points Z and W. Accordingly, the taxi driver takes both passengers from P to Z, whereupon A leaves the taxi. It may happen that another person C is waiting at point Z and wishes to be brought by taxi to the railroad station P. However, this person C is willing to first travel to point W, the destination of passenger B. Accordingly, from point Z to point W, passengers B and C ride together. At point W, passenger B leaves the taxi, and the taxi then drives from W back to railroad station P with only the one passenger C.

Alternatively, the trip may take a second form. A passenger A at the station P wishes to be driven to point U. On the way to point U, a person B standing at a traffic light sees that the taxi carrying passenger A is driving in the general direction in which B wishes to travel. B hails the taxi at V, and from point V to point U both passengers A and B ride together.

A taxi trip may also take a third form. For example, two passengers, A and B, may desire to be driven from station P to two points Y and X, respectively. Both passengers A and B will ride as far as point Y, whereafter the passenger B will be driven alone to point X. Accordingly, the taxi driver must compute a first fare for the trip by passenger B from point P to point X, and another fare for the trip by passenger A from point P to point Y.

A fourth exemplary trip involves the points P, T and S. Three passengers A, B, C enter the taxi at station P. Passengers B and C are together and want to go to point T, whereas passenger A wishes to go to point S. In this case, all three passengers A, B, C travel together from station P to point T and then A is driven further alone to point S.

In all these cases, the computation of the fares for the various passengers is considerably more complicated than in simple one-passenger taxi systems. Firstly, the fare computation takes into account the different, often overlapping distances travelled by the different passengers. In addition, to induce a passenger to share the taxi with another passenger, it is considered important to reduce the fare rate for those portions of the trip in which more than a single passagener rides. Preferably, if three passengers share a taxi, the fare rate for each passenger is reduced to a greater degree than if only two passengers share the taxi. In this way, the taxi passenger will be induced to actively seek another passenger to share his trip. Or else, if a passenger is riding alone and sees a potential passenger waiting at an intersection, he will be induced to point this out to the driver, instead of, for example, discouraging the driver from stopping to pick up the additional passenger. Also, when an additional passenger is taken on, the fare rate for each individual passenger must be reduced, to take into account the possibility that one of the passengers may be driven out of his way a certain distance in order to reach the destination of the fellow passenger. Specifically, a passenger should know that even if the taking on of an additional passenger means that the trip will be somewhat longer, because of the possibility that the destination of the second passenger will necessitate a detour, his fare will still be substantially less than if he made his trip alone.

The shuttle-type taxi system can be set up in such a manner that the taxis do not have a fixed point of reference or standing place, such as an airport or large railroad station, but instead have a single route which they repeatedly traverse, for example a predetermined succession of streets leading through a major business district. For this type of taxi system, too, the fare computation complications described above arise.

Figure 4:
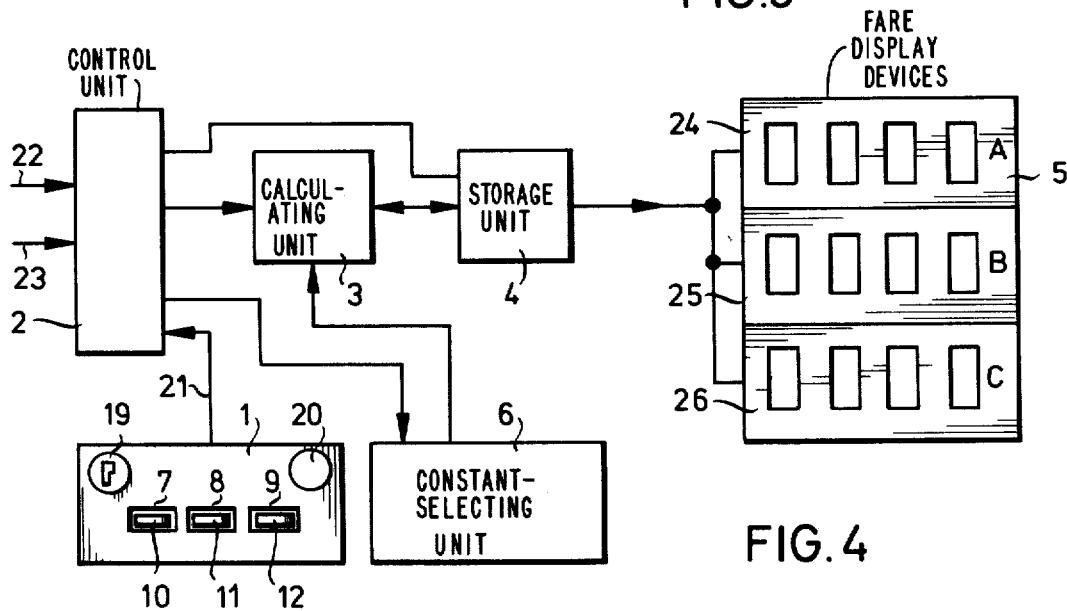
FIG. 4 is a schematic illustration of a first embodiment of a taximeter according to the invention.
Figure 5:
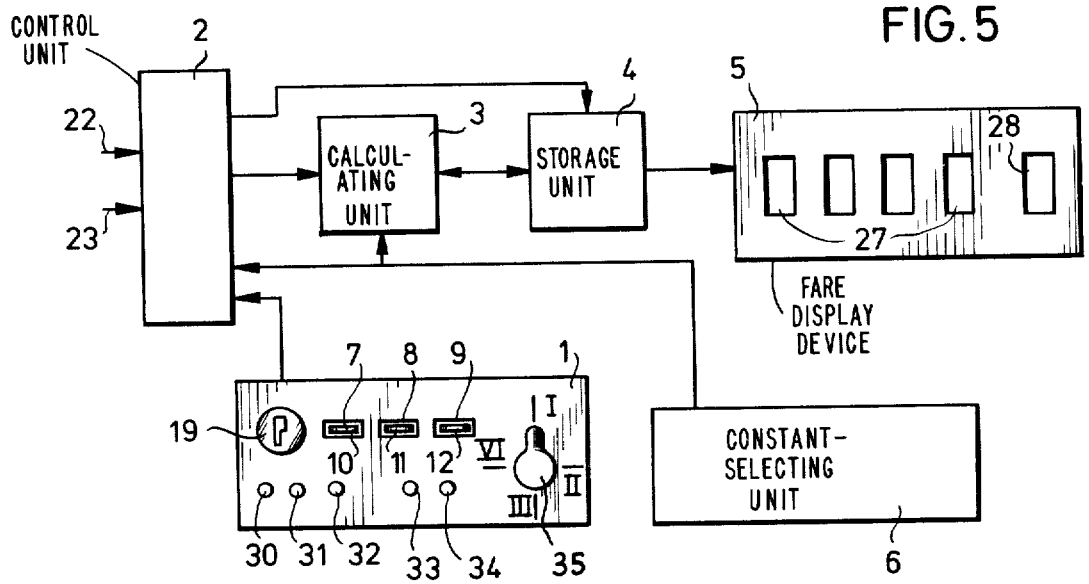
FIG. 5 depicts a second embodiment.
Figure 6:
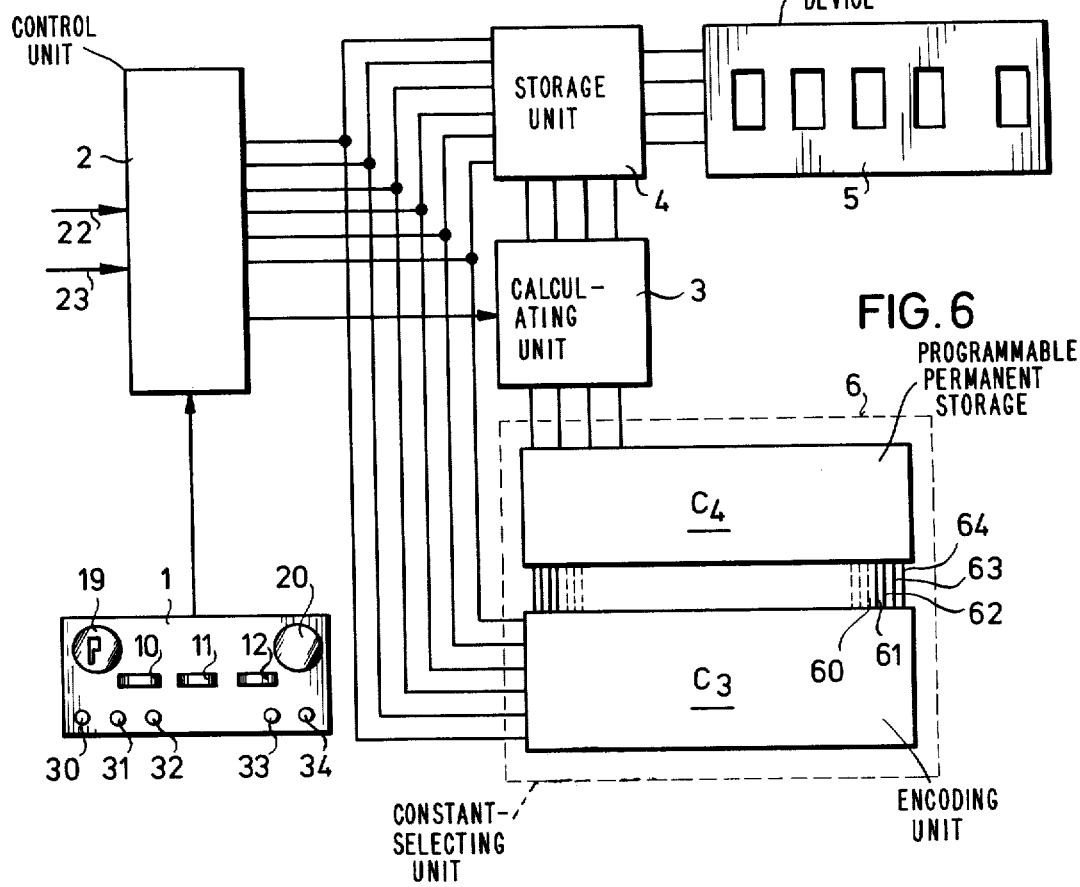
FIG. 6 depicts the embodiment of FIG. 5 in greater detail.

FIG. 4 depicts in schematic manner one embodiment of a taximeter according to the invention, adapted for use in the shuttle-type taxi system described above. The taximeter includes a control panel 1 provided with buttons and switches manually activatable by the taxi driver, a control unit 2 comprised of logic circuits, a calculating unit 3 operative for performing elementary calculations under the control of the control unit 2, a storage unit 4 operative for storing signals representative of results calculated by the calculating unit 3 and also for storing raw information to be fed to the calculating unit under the control of the control unit 2, and finally a constant-selecting unit 6 in the form of a programmable permanent storage (such as a matrix plugboard or the like) in which are stored various constants necessary for calculating the fare, for example the base fare which is established at the very beginning of the trip before the vehicle has even begun to move, etc. An electronic taximeter of the general type shown in FIGS. 4, 5 and 6 is disclosed in very great detail in commonly owned U.S. patent application Ser. No. 323,908 of Manfred Fichter et al., filed Jan. 19, 1973 and entitled "ELECTRONIC TAXIMETER HAVING INTERCHANGEABLE CONSTANT FURNISHING MEANS", now U.S. Pat. No. 3,860,806.

The control panel 1 shown in FIG. 4 has three keyholes 7, 8 9 into which can be inserted and removed coordination keys 10, 11, 12, each corresponding to and serving to establish coordination with one taxi passenger A or B or C. If the taxi is capable of accommodating more than three passengers, then of course a suitable number of Keyholes and coordination keys will be provided.

Advantageously, the order in which the coordination keys 10, 11, 12 are withdrawn from the respective keyholes 7, 8, 9 is completely arbitrary. In other words, if one passenger enters an occupied taxi, the driver can pull out the key 10 or the key 11 or the key 12.

Advantageously, a particular coordination key is not associated with a particular seat location in the passenger compartment, thereby making it unnecessary to provide "hot seat" switches and the like. However, seat switches can be provided for back-up purposes or for other purposes, if desired.

FIGS. 2a, 2b, 2c and 3a, 3b, 3c depict an exemplary design of the coordination keys 10, 11, 12. The keys can be made of any suitable material, advantageously molded plastic, and be provided at their lower ends (the ends which are inserted into the openings 7, 8, 9) with projections 13, 14 or 15. Each projection 13, 14 or 15 has a different position, so that the coordination keys 10, 11, 12 for the passengers A, B, C are different from each other. The projections 13, 14, 15 are so disposed that when the respective coordination keys are inserted into the respective openings 7, 8, 9, the projections 13, 14, 15 open or close contacts and/or actuate light barriers of photoelectric detector units, or in other manner activate electrical control circuitry. It will be understood that the electrical contacts or the like which are activated upon insertion of the coordination key into the respective key could as well be activated by means other than the projections 13, 14, 15. In other words, the projections 13, 14, 15 are merely exemplary, could be otherwise located, or could be replaced by activating portions of completely different configuration, etc.

Additionally, as best seen in FIGS. 3a, 3b, 3c, the sides of the coordination keys 10, 11, 12 are provided with recesses 16 which cooperate with complementary projections 18 on the sides of the openings 7, 8, 9 into which the coordination keys are inserted. A comparison of the three keys 10, 11, 12 and three openings 7, 8, 9 shown in FIGS. 3a, 3b, 3c makes clear that these are provided with differently disposed recesses and projections. Accordingly, each of the three coordination keys can be inserted into only one of the three openings 7, 8, 9 and will not fit into the other two.

The taximeter control panel 1 is furthermore provided with a keyhole of a lock 19 which serves among other functions to turn on or off the entire taximeter. The lock 19 has predominantly the purpose of enabling the owner of the taximeter, or his authorized employee, to put the control counters contained in the taximeter into the read-out mode, when it is desired to inspect the readings on these counters. Additionally, the lock 19 activates a switch connected in the current path of the switches activated by the projections 13, 14, 15 of the coordination keys. When the lock 19 is not in the operative position the switches controlled by the coordination keys are rendered ineffective. When the taxi owner puts the lock 19 into another position, the coordination keys 10, 11, 12 can no longer be removed from their respective openings 7, 8, 9; however, readouts of the control counters of the taximeter can be made. In addition, the control panel 1 is provided with a zero-setting button 20 which when activated erases all the information stored in the erasable storages of the taximeter, except those associated with the control counters, such as total mileage, total number of trips, and the like.

The setting of the control panel 1 is communicated to the control unit 2 by means of coded signals applied to the latter. In other words, each time a button on control panel 1 is activated, or a key 10, 11, 12 is removed or inserted, or the lock 19 turned to a different position, a coded combination of pulses, representing the setting of the taximeter, is applied to the control unit 2, which accordingly is completely informed of all the settings of all the settable components of the control panel 1.

The control unit 2 receives via lines 22 and 23 distance and time pulse trains which are used for the computation of fares. For example, the time pulse train consists simply of a train of pulses having a fixed pulse-repetition frequency, for example 0.1 Hz. The distance pulse train is derived, for example, from a tachometer unit provided on the wheel of the taxi, and has a pulse-repetition frequency proportional to vehicle speed, and accordingly a pulse-repetition period proportional to distance travelled. The control unit is a complex logical network provided in "hardware" form, i.e., a special purpose computer, or in "software" form, as a special purpose program for a computer capable of more general use. The control unit 2 stores the entire program for running the taximeter and coordinating the operations of the individual components of the taximeter, i.e., coordinating the computing unit 3, the constant-selecting unit 6, the control panel 1, the storage unit 4, and the display unit 5.

Figures 2, 3:
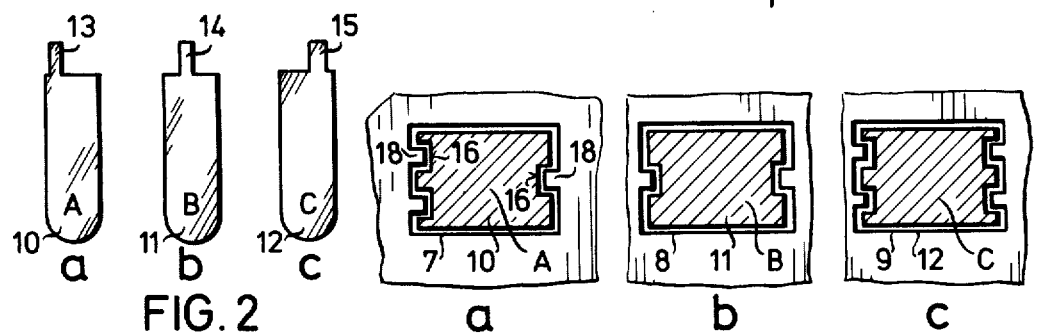
FIGS. 2a, 2b, 2c depict different coordination keys.
FIGS. 3a, 3b, 3c are sections through the coordination keys of FIGS. 2a, 2b, 2c and the surrounding keyholes.

The constant-selecting unit 6 is a so-called programmable permanent value storage, i.e., a storage capable of storing selected constants indefinitely, but capable of being reprogrammed to indefinitely store other selected constants. Such a storage can be essentially comprised of a perforated card or else a plugboard-type matrix of switches, for example. The constant-selecting unit 6 has the purpose of adapting the taximeter to any system of fare computation which may be desired, including the weight to be given to elapsed distance units, elapsed time units, changes in such weigthing, and the like. Such a constant-selecting unit 6 is in general necessary, because methods of computing fares may differ greatly from one community to the next. Details of the construction of an exemplary constant-selecting unit are depicted in FIGS. 2 and 2a of the commonly owned U.S. application referred to above.

The storage unit 4 is essentially comprised of 64 storage locations. Each storage location is capable of registering a decimal number between 0 and 9 in the form of a four-bit binary number. Experience has shown that a storage unit having 64 such four-bit storage locations is generally sufficient for the present purposes. Self-evidently, however, the storage unit can be provided with a larger number of storage locations if necessary or desired. These storage locations serve for the intermediate storage of individual fares during the ongoing computation of such fares, and also for the storage of total values required for accounting purposes. In the present case, for example, there will be provided for each one of the three passengers A, B, C four four-bit storage locations for the storage of a four-digit decimal number; i.e., with three passengers 12 four-bit storage locations are assigned for the specific purpose of storing the individual computed fares.

The computation of the individual fares is performed in dependence upon the incoming distance and time pulse trains applied via lines 22, 23 to the control unit 2. The control unit 2 coordinates these incoming pulse trains with the settings of the settable switches of the control panel 1, and with the constants stored in the constant-selecting unit 6 and with the information already stored in the storage 4 and causes the calculating unit 3 to perform elementary calculations in dependence upon the control panel settings, in dependence upon the values set on constant selecting unit 6, and in dependence upon the information already stored in the storage 4 as a result of previous calculating operations. In this manner, during the course of the trip, the individual fares are calculated and registered by the respective groups of storage locations in storage unit 4.

A display unit 5 is connected to the output of the storage unit 4. In the embodiment of FIG. 4, the display unit 5 is composed of three discrete indicators 24, 25, 26. The indicator 24 displays the fare for passenger A, the indicator 25 for passenger B, and the indicator 26 for passenger C. The indicator elements of the indicators are of per se known construction, usually operating in a pulsed manner at a frequency high enough to give to the human eye the appearance of continuity in time.

Each time that the four four-bit storage locations in storage unit 4 which correspond to passenger A are read out, the associated indicator 24 is activated, to display the information being read out. If, on the other hand, the four storage locations in storage unit 4 corresponding to passenger B are being read out, the indicator 25 is activated. The operation is the same for the storage locations associated with passenger C and the indicator 26. If only a single passenger A occupies the taxi, with accordingly only the coordination key 10 removed from its hole 7, then an indication is provided only on the indicator 24. The other indicators 25 and 26 each display the value "0000" because the associated storage locations in unit 4 register zero fare.

A somewhat more advanced embodiment is schematically depicted in FIG. 5. The embodiment of FIG. 5 differs from that of FIG. 4 essentially in the use of only a single four-digit indicator 27 in the display unit 5. However, in addition to the four-digit indicator 27, there is provided an additional indicator 28 which indicates whether the fare being displayed on indicator 27 is the fare associated with passenger A or the fare associated with passenger B or the fare associated with passenger C.

The control panel 1 in FIG. 5 again includes coordination keys 10, 11, 12 which are insertable into and removable from respective openings 7, 8, 9. However, in FIG. 5 there are additionally provided buttons 30, 31, 32, each associated with a respective one of the coordination keys 10, 11, 12. When one of the three buttons 30, 31, 32 is pressed by the taxi driver, the display unit 5 becomes operatively connected to those of the storage locations in unit 4 which correspond to the coordination key associated with the pressed button. As a result, when one of the three buttons 30, 31, 32 is pressed, the fare associated with the respective passenger is displayed on the indicator 27. In addition, the indicator 28 indicates which passenger's fare is being displayed.

The embodiment of FIG. 5, compared to that of FIG. 4, has the advantage that only a single indicator unit is required for three passengers. This arrangement inherently consumes less space than the FIG. 4 arrangement and is less expensive; particularly when the circuitry of units 2, 3 and 4 is in the form of integrated, printed or miniaturized circuitry, the cost of the visual display units may be comparable to the cost of the circuitry, so that the cost reduction in such event would be very considerable. The disadvantage of the FIG. 5 arrangement is that each passenger is only able to see his fare for a short interval of time, namely the interval of time during which the respective one of buttons 30, 31, 32 is depressed.

The control panel 1 of FIG. 5 is provided with two further buttons 33 and 34. Associated with each one of these two buttons 33 and 34 is a respective group of four four-bit storage locations in unit 4. The first group of four four-bit storage locations serves to store the sum of the fares collected during one trip. The second group of four four-bit storage locations serves to store the cumulative sum of fares collected over a longer time period, such as a day, a month, a year, etc. When one of the two buttons 33, 34 is depressed, either the total fare collected during a trip is displayed or the cumulative total of collected fares is displayed.

The control panel 1 in FIG. 5 is furthermore provided with a four-position rotary switch 35 which can be moved into positions designated I, II, III and IV. By moving switch 35 to different ones of these positions, different fare tariffs are established. For example, position I is associated with the normal fare tariff for a particular locality. Position II would for example be associated with a more costly night or holiday fare tariff. Position III cound be associated with a fare tariff based exclusively on distance, in which waiting time plays no part; this fare tariff might be selected, for example, when making a long-distance or out-of-town trip. Position IV could for example be used to set some or all of the storage locations in unit 4 to zero.

It is also considered advantageous to design the control unit 2 to effect cyclical display of the fares associated with the various passengers, i.e., in the order A, B, C, A, B, C, etc., with each fare being displayed for 30 seconds, for example, on the indicator 27 before the next fare is displayed. Again, as each fare is displayed, the indicator 28 indicates the passenger associated with such fare, for example by indicating the letters "A", "B" and "C".

As already mentioned above, it is desired to induce both the taxi driver and the passenger to take on additional passengers whenever possible. To this end, it is advantageous not merely to select for each individual passenger a fare tariff lower than the normal tariff of an ordinary one-passenger-type taxi, but instead to actually make the computation of the fare dependent upon the number of passengers being carried during such computation.

Considering, for example, the trip from P (FIG. 1) via Z to W and then back to P, the passengers A and B during the leg P-Z of the trip should be charged at a lower rate, and likewise the passengers B and C during the leg Z-W of the trip should be charged at a lower rate, than if only a single passenger were riding.

Likewise, for the leg W-P of the trip, the passenger C must be charged at a higher rate, since he is riding alone. In like manner, during the trip from P to S via T, the passengers should be charged during the leg P-T at a rate lower than charged to passenger A for the leg T-S.

Figure 7:
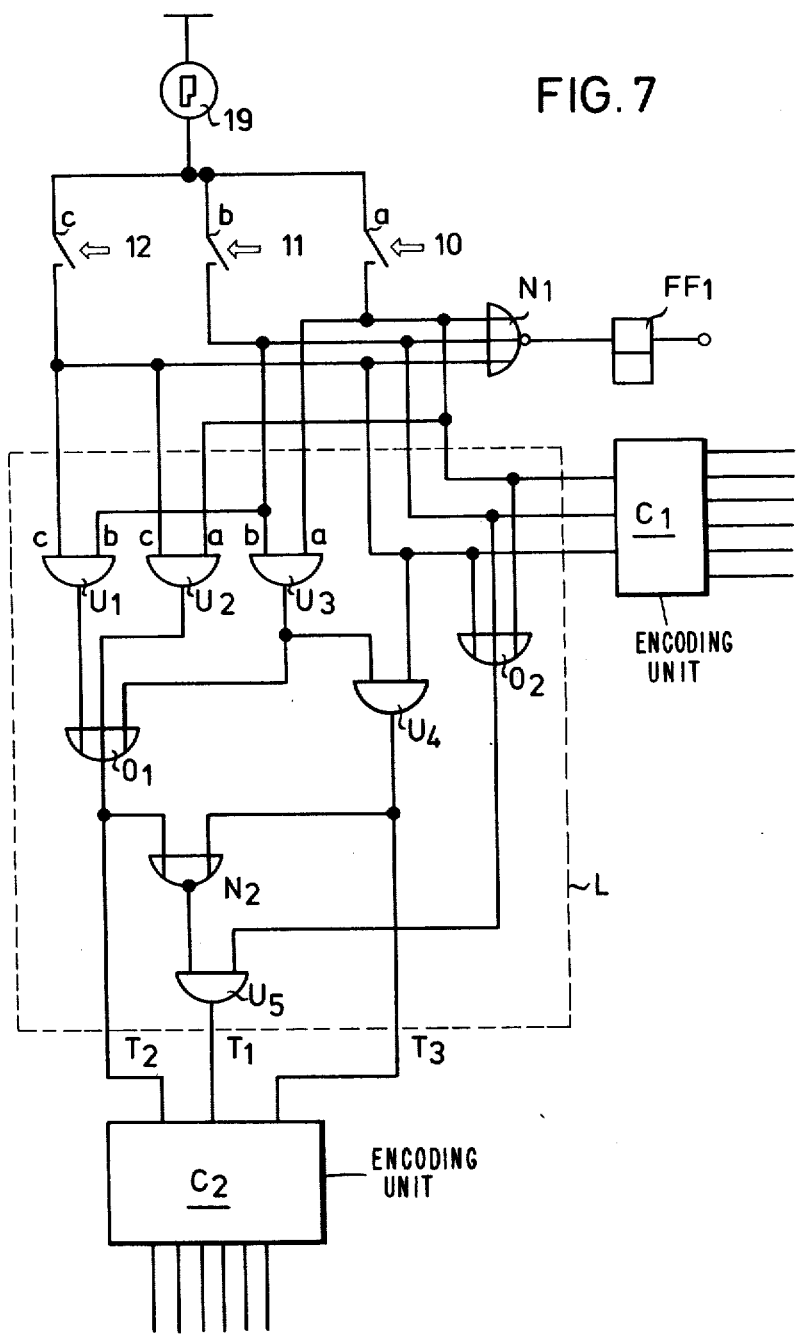
FIG. 7 depicts a circuit employed for selecting the fare rate and for addressing storage locations in the storage and calculating circuitry of the taximeter.

FIG. 7 depicts a circuit arrangement which in dependence upon the removal of different ones of the coordination keys 10, 11, 12 not only selects different storage locations in unit 4 but also automatically changes the fare tariff in dependence upon the number of passengers.

The illustrated switches $a$, $b$ and $c$ are activated by respective ones of the coordination keys 10, 11, 12. When one of the keys 10, 11, 12 is withdrawn from the taximeter, the respective one of switches $a$, $b$, $c$ closes; conversely, when a key is reinserted into the taximeter, the associated one of switches $a$, $b$, $c$ opens. A switch controlled by the lock 19 is connected in the current path of all three switches $a$, $b$, $c$. Each of the switches $a$, $b$, $c$ is connected to a respective one of the three input terminals of a NOR-gate $N_1$. The output of NOR-gate $N_1$ is connected to one input of a flip-flop $FF_1$. When all three switches $a$, $b$, $c$ are open—i.e., when none of the keys 10, 11, 12 are withdrawn from the taximeter—then a "0" signal is applied to each of the three inputs of NOR-gate $N_1$. Accordingly, there is a "1" signal at the output of NOR-gate $N_1$. This "1" signal causes the flip-flop $FF_1$ to be maintained in the first of its two states. When flip-flop $FF_1$ is in the first state thereof, all fare computations in the taximeter are stopped. Only when one or more of the keys 10, 11, 12 are withdrawn from the taximeter, closing one or more of switches $a$, $b$, $c$ and causing flip-flop $FF_1$ to assume the second state thereof, does a fare computation commence.

The switches $a$, $b$, $c$ are furthermore connected to respective ones of the three inputs of an encoding unit $C_1$. The encoding unit $C_1$ converts the three-bit number constituted by the signals directly derived from switches $a$, $b$, $c$ into a six-bit binary output for the selection of one of the 64 four-bit information storage locations in storage unit 4.

Assume, for example, that the lowest digit (the units digit) of the four-decimal-digit fare for the passenger A is associated with four-bit storage location No. 1 in storage unit 4. In that event, during the intermittent but cyclically repeating read-out of storage location No. 1, the encoding unit $C_1$ is interrogated as to whether or not the associated switch $a$ is closed. If switch $a$ is closed, then measurement pulses possibly accumulating in storage location No. 1 are taken into account, after being combined with the constants in the constant-selecting means 6. The type of information transfer in question is set forth in very great detail in the description of the operation of the taximeter disclosed in the commonly owned U.S. patent application identified above. Assume, furthermore, that the fare for passenger B is stored in storage locations No. 5, No. 6, No. 7 and No. 8 of storage unit 4. Then, each time that storage location No. 5 is read, the encoding arrangement $C_1$ is interrogated as to whether switch $b$ is closed or not. If the switch $b$ is closed, then the respective fare is computed. If the fare associated with passenger C is stored in storage locations No. 9 to No. 12, then each time that storage location No. 9 is read, the encoding unit $C_1$ is interrogated as to whether switch $c$ is closed, and if switch $c$ is closed there occurs a fare computation operation and a writing in of a calculated fare into storage locations No. 9 to No. 12.

The logic circuit L (FIG. 7) determines the fare tariff to be employed for computing the fares for the passengers. The logic circuit L is composed of five AND-gates $U_1$, $U_2$, $U_3$, $U_4$, $U_5$, two OR-gates $O_1$, $O_2$ and a NOR-gate $N_2$. The logic circuit L determines how many of the switches $a$, $b$, $c$ are closed, and accordingly determines the number of passengers and, on that basis, chooses from among the three fare rates $T_1$, $T_2$, $T_3$. Fare rate $T_1$ corresponds to a single passenger riding alone and involves the use of the highest available multiplication factor set in the constant-selecting unit 6. Fare rate $T_2$ corresponds to two passengers sharing the taxi and involves the use of the middle available multiplication factor set in the constant-selecting unit 6. Fare rate $T_3$ corresponds to three passengers sharing the taxi and involves the use of the lowest available multiplication factor set in the constant-selecting unit 6.

The two inputs of AND-gate $U_3$ are respectively connected to switches $a$ and $b$. The two inputs of AND-gate $U_2$ are respectively connected to switches $a$ and $c$. The two inputs of AND-gate $U_1$ are respectively connected to switches $b$ and $c$. The outputs of AND-gates $U_1$, $U_2$, $U_3$ are connected to the input of OR-gate $O_1$. Each time that any two of the three switches $a$, $b$, $c$ are closed, a "1" signal will appear at the output of OR-gate $O_1$. Accordingly, the line $T_2$ indicating that there are two passengers present and that tariff $T_2$ should be used, is maintained at logic level "1". The output of AND-gate $U_3$ is additionally connected to one input of AND-gate $U_4$, the other input of which is connected to the switch $c$. In other words, a "1" signal will appear at the output of AND-gate $U_4$ when all three switches $a$, $b$, $c$ are closed. Accordingly, line $T_3$ will be maintained at logic level "1", indicating that tariff TIII should be employed. Tariff I is employed when neither tariff II nor tariff III is to be employed, namely when only a single one of the switches $a$, $b$, $c$ is closed. To this end, the switches $a$, $b$, $c$ are additionally connected to an OR-gate $O_2$, the output of which is connected to one input of AND-gate $U_5$. The outputs of OR-gate $O_1$ and of AND-gate $U_4$ are additionally connected to respective inputs of a NOR-gate $N_2$. When "0" signals are present at the outputs of both gates $O_1$ and $U_4$, then there will be a "1" signal at the output of NOR-gate $N_2$. This "1" signal, together with the "1" signal at the output of OR-gate $O_2$, causes a "1" signal to appear at the output of AND-gate $U_5$. Accordingly, the output line $T_1$ associated with tariff TI will be at logic level "1". The signals on tariff-selection lines $T_1$, $T_2$, $T_3$ are applied to the input of a further encoding unit $C_2$. Encoding unit $C_2$ converts the three-bit input applied to it to a six-bit output signal which causes the incoming measuring pulses (distance and/or time pulse trains) to be frequency-divided by a frequency-division factor preset in the constant-selecting unit 6 and appropriate for which ever the three tariffs TI, TII, TIII has been automatically selected. It is to be noted that the components shown in FIG. 7, namely $N_1$, $FF_1$, $C_1$, L and $C_2$ are parts of the control unit 2 shown in FIGS. 4, 5 and 6, which of course contains additional circuitry for controlling and coordinating the operations of the various parts of the taximeter circuit.

FIG. 6 will make clearer the manner in which the control unit 2 cooperates with the storage unit 4, the calculating unit 3 and the constant-selecting unit 6. The constant-selecting unit 6 is comprised of two parts, an encoding unit $C_3$ and the actual programmable permanent storage $C_4$ which stores the constants needed for computing fares according to different tariffs, etc. The encoding unit $C_3$ has the purpose of converting the six-bit addressing input received from control unit 2 into the energization of different ones of the 64 output lines of encoding unit $C_3$. The incoming six-bit addressing input signal applied to $C_3$ by control unit 2 is for example derived from the output of storage-location selecting unit $C_1$ and from the output of tariff-selecting unit $C_2$. The energization of different ones of the 64 outputs of $C_3$ results in the use of different ones of the preselected constant values permanently but reselectably stored in $C_4$. The interrelationship between $C_3$ and $C_4$ in FIG. 6 is the same as the interrelationship between units 21 and 22, 23 in the above-identified commonly owned copending application.

Accordingly, as soon as the control unit 2 applies to the unit $C_3$ a six-bit parallel-code signal, whether this be a storage location addressing signal derived from $C_1$, or whether this be a tariff-selection signal derived from $C_2$, the six-bit signal will be decoded by unit $C_3$ and will result in the read-out of one of the 64 storage locations provided in the constant storage $C_4$. The constant storage $C_4$ has four output lines leading to the calculating unit 3. When one of the 64 storage locations in constant storage $C_4$ is read out, the constant read out appears in binary-coded form on the four output lines of $C_4$, and is applied to the calculating unit $C_3$. The number registered in one of the 64 four-bit storage locations in storage unit 4 will simultaneously be presented to the other four inputs of the calculating unit 3. The calculating unit 3 will then combine the information received from $C_3$ and from unit 4, on the basis of multiplication, addition, subtraction, comparison or in other manner, and will produce a resulting number which is then stored in the respective storage location in unit 4. It will be noted that the storage unit 4 is provided with four output lines connected to the indicator 5, these four output lines becoming connected with different ones of the 64 four-bit storage locations in unit 4, all under the control of control unit 2.

It will be understood that each of the elements described above, or two or more together, may also find a useful application in other types of circuits and constructions differing from the types described above.

While the invention has been illustrated and described as embodied in an electronic taximeter for shuttle-type taxi systems, it is not intended to be limited to the details shown, since various modifications and structural changes may be made without departing in any way from the spirit of the present invention.

For example, instead of designing the arrangement so that withdrawal of one of the keys 10, 11, 12 initiates fare computation, the arrangement could be designed such that insertion on one of the coordination keys initiates fare computation. This latter alternative, however, has the disadvantage that the coordination keys will be removed from the taximeter for the great majority of the total working time, which can lead to loss of the coordination keys. Additionally, the possibility of fraud with the latter alternative is much greater than with the alternative described herein, which is preferred for reasons of safety and security.

Figure 8:
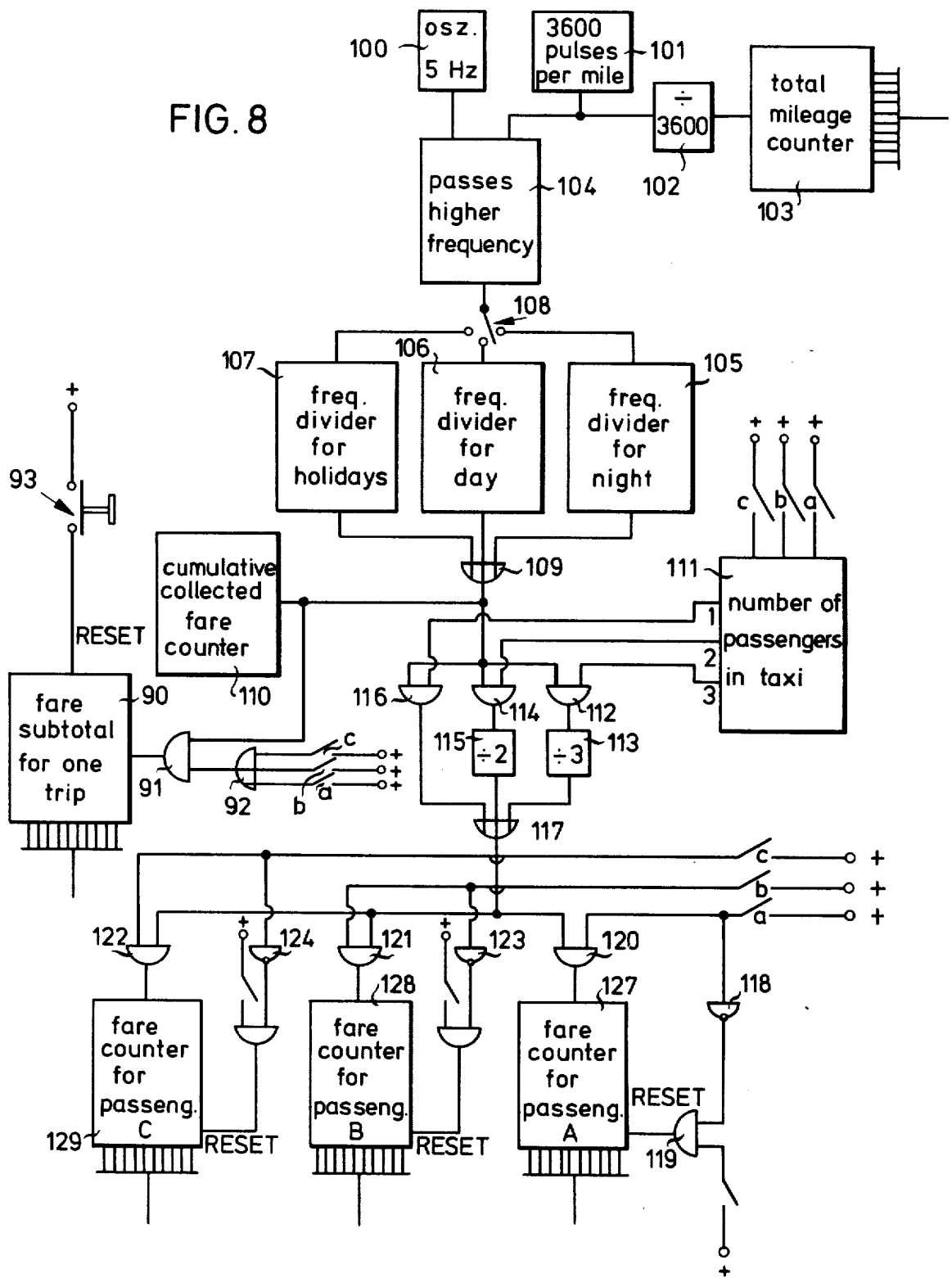
FIG. 8 depicts another embodiment of the invention.

FIG. 8 depicts in schematic block-diagram form another embodiment of the invention.

An oscillator 100 generates very short-lasting pulses at a frequency of 5 Hz. A pulse generator 101 generates short-lasting pulses at a pulse-repetition frequency proportional to vehicle speed. The pulse generator 101 can consist essentially of a tachometer-type pulse generator mounted on a wheel axle and a frequency divider connected to the output of the pulse generator. In this embodiment, the pulse generator 101 generates 3600 short-lasting pulses per mile. The pulse train generated by generator 101 is applied to a frequency divider 102, which divides the frequency of the incoming pulse train by 3600, and passes the resulting waveform onto a total mileage counter 103 which, as will be evident, receives one pulse for each mile travelled.

The pulses generated by units 100 and 101 are also applied to the input of a frequency-comparing circuit 104 which passes whichever of the two incoming pulse trains has the higher frequency. Such a frequency-comparing circuit is disclosed in FIG. 1 of U.S. Pat. 3,388,859 of Heinz Kelch et al. When the taxi is travelling at 5 m.p.h. the pulse-repetition frequency of the pulse train generated by unit 101 will be 5 Hz, identical to the frequency of oscillator 100. Accordingly, if the taxi is travelling at below 5 m.p.h., the fare will be computed on a pure waiting time basis, or equivalently, as though the taxi were travelling at exactly 5 m.p.h.

The output pulse train from unit 104 is applied by means of a three-position switch 108 to one of three frequency dividers 105, 106, 107. The switch 108 is a manual switch set by the taxi driver. The frequency dividers 105, 106, 107 introduce different scale factors for different fare tariffs, respectively associated with night, day and holiday travel. Of course, if such tariff differences do not exist in a particular locality, the frequency dividers 105 and 107 can be omitted.

The outputs of all three frequency dividers 105, 106, 107 are connected to the inputs of OR-gate 109. The output of OR-gate 109 is connected to the input of a cumulative collected fare counter 110. The frequency-division factors introduced by the frequency dividers 105–107 are all such that each pulse appearing at the output of OR-gate 109 represents one fare unit, e.g., 10 cents. Accordingly, the counter 110, simply by counting up the fare units, is keeping a cumulative record of collected fares.

Figure 12:
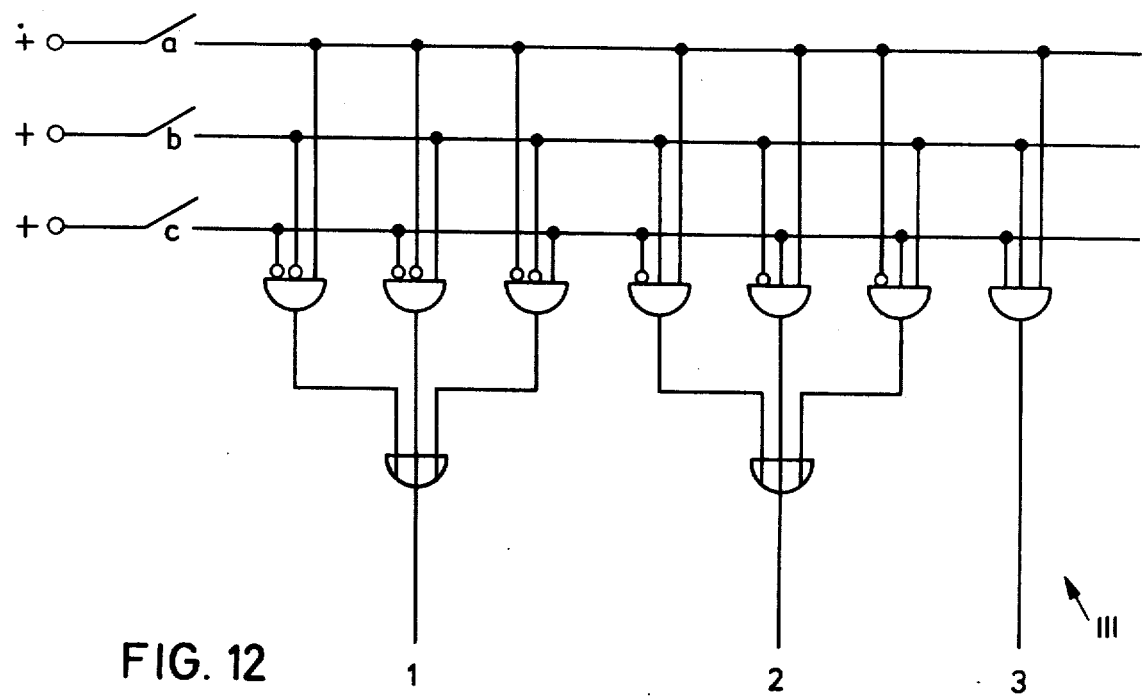
FIG. 12 depicts in detail the circuit of unit 111 in FIG. 8.

The output pulses of OR-gate 109 are additionally applied to the lower input of each of three AND-gates 112, 114, 116. The upper input of each of the three AND-gates 112, 114, 116 is connected to a respective one of three outputs of a unit 111. Unit 111 has three inputs directly connected to switches $a, b, c$. Switches $a, b, c$ are respectively associated with coordination keys 10, 11, 12, associated with passengers A, B, C. When one of the coordination keys is removed, the associated one of switches $a, b, c$ closes. Unit 111 is a logic circuit which determines how many of the three switches $a, b, c$ are closed, and thereby determines how many passengers are riding in the taxi. The circuitry of unit 111 is shown in FIG. 12. If only one of switches $a, b, c$ is closed, then there appears a "1" signal at output No. 1 of unit 111; the other two outputs have "0" signals. If exactly two of the switches $a, b, c$ are closed, then there appears a "1" signal at output No. 2 of unit 111; the other two outputs have "0" signals. If all three of the switches $a, b, c$ are closed, then there appears a "1" signal at output No. 3 of unit 111; the other two outputs have "0" signals.

Accordingly, the 10 cents fare unit pulses appearing at the output of OR-gate 109 are transmtted directly to OR-gate 117 if only one passenger is riding. If two passengers are riding, then the 10 cents fare unit pulses at the output of OR-gate 109 are applied to frequency divider 115, which passes every second received pulse to the input of OR-gate 117. If three passengers are riding, then the 10 cents fare unit pulses are applied to the input of frequency divider 113, which passes every third received pulse onto the OR-gate 117.

The pulses appearing at the output of OR-gate 117 are then applied to the lower inputs of the three AND-gates 120, 121, 122. The upper inputs of the AND-gates 120, 121, 122 are connected to respective ones of the switches a, b, c, which are the same switches referred to above.

The output of each of AND-gates 120, 121, 122 is connected to the input of a respective one of binary counters 127, 128, 129. These are all resettable binary counters having an illustrated RESET input. Evidently, the 10 cents fare unit pulses applied to the inputs of any particular one of AND-gates 120, 121, 122 will only be registered by the associated counter 127, 128, 129 if the respective one of switches a, b, c is closed.

Since each pulse appearing at the output of OR-gate 117 and registered by one of the fare counters 127, 128, 129 represents a 10 cents fare unit, the number stored in binary form in each of counters 127, 128, 129 is directly indicative of the number of 10 cents fare units contained in the computed fare of the respective passenger. As will also be clear, the provision of the unit 111 and of the frequency dividers 113 and 115 causes the rate charged to a passenger to be cut half when he shares the taxi with one other passenger, and to be cut down to one-third the one-passenger rate when he shares the taxi with two other passengers.

The binary-coded output signals of the three fare counters 127, 128, 129 are applied to display means, in a manner described below.

When a particular passenger arrives at his destination and the taxi stops, the passenger returns his key to the taxi driver, who reinserts the key into the taxi meter. As a result, the respective one of counters 127, 128, 129 can receive no further 10 cents fare unit input pulses. However, the fare stored in the respective one of counters 127, 128, 129 is not erased, until after the passenger actually pays his fare. In this way, the fare continues to be displayed, in a manner described below, so that the passenger can see how much he much pay. When the passenger pays his fare, the taxi driver presses a "CLEAR" button on the front of the taximeter. This results in the closing of the three CLEAR switches CL depicted in FIG. 8. As a result, the one of counters 127, 128, 129 associated with the now-closed one of switches a, b, c will become reset to zero; however, the other ones of fare counters 127, 128, 129, corresponding to passengers who have not yet reached their destinations, will not be reset to zero. This feature results from the provision of inverters 118, 123, 124 and AND-gates 119, 125, 126 connecting the switches a, b, c to the RESET inputs of the respective counters 127, 128, 129.

In this embodiment, it is clear that a passenger benefits from sharing the taxi with one additional passenger, and benefits still more from sharing the taxi with two additional passengers. However, in this embodiment the total fare collected will not increase as a result of the greater number of passengers carried, except to the extent that the distance travelled actually increases because of the necessary detours. If it is desired to provide a greater inducement to the taxi driver to carry the maximum number of passengers, while retaining the same inducement for the passengers themselves, the frequency dividers 105, 106, 107, 113 and 115 can be set to different scale factors. For example, if the frequency dividers 105, 106, 107 each divide the input frequency by a different respective factor n, then these frequency dividers could be modified to divide the input frequency by a different respective factor $n/2$. One would then insert a frequency halver between the output of OR-gate 109 and the input of counter 110. The frequency divider 113 would be replaced by a frequency divider which divided by 5, the frequency divider 115 would be replaced by a frequency divider which divided by 3, and a frequency divider which divided by 2 would be connected between the output of AND-gate 116 and the input of OR-gate 117. As a result, the rate tariff changes occurring in automatic dependence upon the number of passengers in the taxi would favor not only the passengers but the taxi driver also. If one passenger rides he pays according to the one-passenger rate. If two passengers ride, they each pay only ⅔ the one-passenger rate for the part of the trip they share. If three passengers ride, they each pay only 2/5 the one-passenger rate for the part of the trip they share. Evidently, the greater the number of passengers, the higher is the fare collected by the taxi driver.

In FIG. 8 there is additionally provided a resettable binary counter 90 which computes fare subtotals for one trip. The 10 cents fare unit pulses appearing at the output of OR-gate 109 and already described are applied to the left input of AND-gate 91. If any of tthe switches a, b, c is closed, these 10 cents fare unit pulses pass through AND-gate 91 to the input of binary counter 90. The taxi driver can at any time reset the binary counter 90 to zero, simply by depressing the pushbutton switch 93. In a manner described below, the taxi driver can manually close a switch and cause the number stored in counter 90 to be displayed in decimal form, giving him an indication of the fare collected during one trip. For example, if the taxi driver shuttles back and forth between two fixed points in a city along a predetermined route, then each time he returns to the starting point he will cause the number stored by counter 90 to be displayed in decimal form, so that he can see how rewarding the trip was, and then he will press the pushbutton switch 93 to reset the counter 90 for his next trip.

Figure 10:
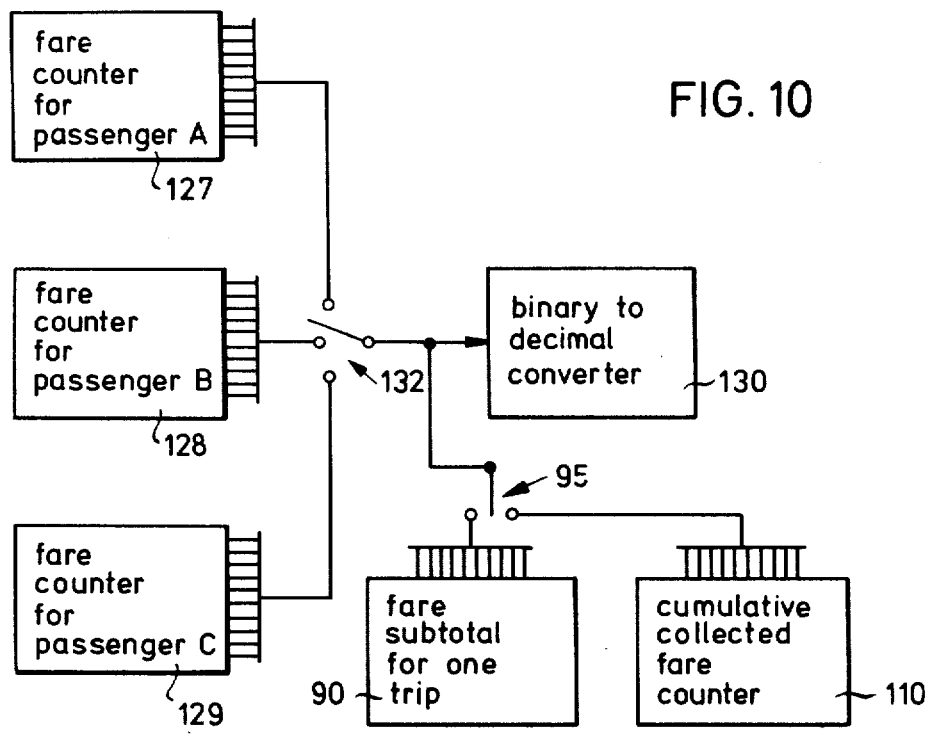
FIGS. 9–11 depict three different ways of visually displaying the numbers registered by the counters of the embodiment of FIG. 8.
Figure 9:
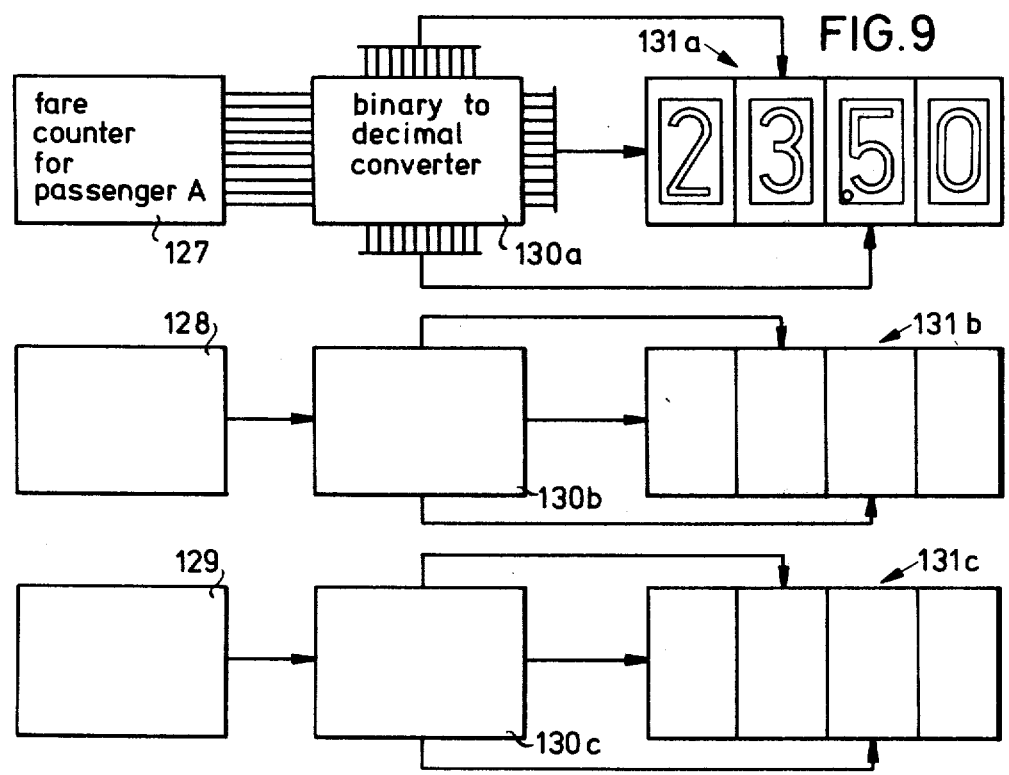
Figure 11:
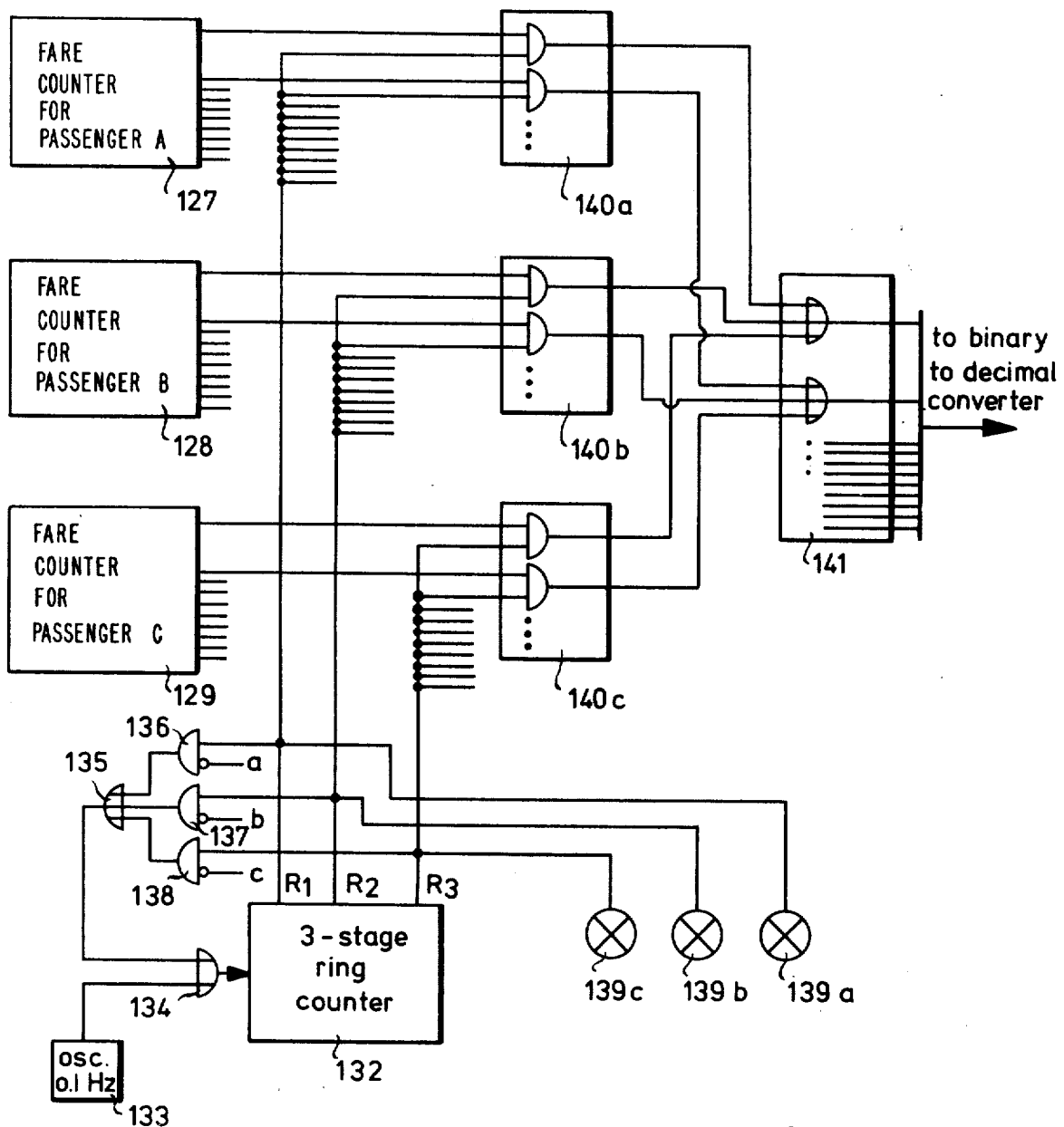

FIGS. 9–11 show three different ways of displaying the numbers stored in the fare counters 127, 128, 129 of FIG. 8.

In FIG. 9, the three fare counters 127, 128, 129 are each connected to a separate respective indicating arrangement. The 10 binary outputs of fare counter 127 are connected to the 10 binary inputs of binary-to-decimal converter 130a. Converter 130a has 30 outputs, a first set of 10 for the first decimal digit, a second set of 10 for the second decimal digit, and a third set of 10 for the third decimal digit. These sets of decimal outputs are connected to respective conventional visual indicators together forming a display device 131a. Since the fare units are 10 cents fare units, and since the number stored by the counter 127 is indicative of the number of 10 cents fare units, the fourth decimal digit displayed by the device 131a will always be zero, in this embodiment. The second and third fare counters 128, 129 are connected to respective arrangements of the same kind.

FIG. 10 shows another way of displaying the fares. There, a switch unit, generally designated 132, is manually controlled by the taxi driver, to select which of the three fares is to be displayed on the display device. Again, each counter 127, 128, 129 has 10 binary outputs. The switch unit 132 consists of ten three-position switches. The switches in unit 132 connect the 10 binary inputs of converter 130 to the 10 binary outputs of the selected one of the counters 127, 128, 129. The converter 130 is connected to a display device 131 as shown in FIG. 9.

Likewise connectable to the binary-to-decimal converter 130, by means of a manually operable switch unit 95 are the binary counter 90 for the fare subtotal for one trip and the binary counter 110 for the cumulative total of collected fares. The taxi driver, when he wishes, can activate switch unit 95 to get an indication of either the total of collected fares over the time of 1 day, 1 month, or the like or else the total of collected fares during one trip.

FIG. 11 shows another way of displaying the fares registered on fare counters 127, 128, 129. Three sets 140a, 140b, 140c of AND-gates are provided. Each set of AND-gates contains 10 AND-gates. Each AND-gate has two inputs. Each of the AND-gate sets 140a, 140b, 140c is associated with a respective one of counters 127, 128, 129. In each set of AND-gates, the upper input of each of the 10 AND-gates is directly connected to a respective one of the 10 binary outputs of the associated one of counters 127, 128, 129. There is also provided a set 141 of 10 OR-gates each having three inputs. The first OR-gate in set 141 has inputs connected to the outputs of the first AND-gates in sets 140a, 140b, 140c. The second OR-gate in set 141 has inputs connected to the outputs of the second AND-gates in sets 140a, 140b, 140c. The third through tenth OR-gates in set 141 are similarly connected.

There is further provided a three-stage ring counter 132 having three outputs R1, R2, R3 and a driving signal input connected to the output of an OR-gate 134. The ring counter output R1 is connected to the lower input of all 10 AND-gates in set 140a. Output R2 is connected to the lower input of all 10 AND-gates in set 140b. Output R3 is connected to the lower input of all 10 AND-gates in set 140c. The outputs R1, R2, R3 are also connected to respective indicator lamps 139a, 139b, 139c having different colors. The coordination keys 10, 11, 12 have the same respective colors as the indicator lamps 139. There are further provided three AND-gates 136, 137, 138, whose upper inputs are respectively connected to ring counter outputs R1, R2, R3. Connected to the lower inputs of each of AND-gates 136, 137, 138 is the output of a respective inverter. Connected to the input of the respective inverter is a respective one of the three abovedescribed switches $a$, $b$, $c$. The outputs of the AND-gates 136, 137, 138 are connected to the inputs of OR-gate 135. The output of OR-gate 135 is connected to one input of OR-gate 134. The other input of OR-gate 134 is connected to the output of a 0.1 Hz oscillator 133 which ordinarily drives the ring counter 132. The outputs of the ten OR-gates in set 141 are connected to respective inputs of a single binary-to-decimal converter 130 (such as the three shown in FIG. 9) which is in turn connected to a single visual display device 131 (such as the three shown in FIG. 9).

The arrangement of FIG. 11 operates as follows:

Assume that the taxi contains three passengers. The 0.1 Hz oscillator 133 drives the ring counter 132. Accordingly, a "1" signal appears first at the output R1 and remains for 10 seconds. During this time the fare counter 127 is connected by the AND-gates 140a and OR-gates 141 to the binary-to-decimal converter 130, and the display device 131 displays the fare registered by counter 127 in the manner explained with reference to FIGS. 9 and 10. During this time, the indicator light 139a is illuminated. As mentioned, the key 10 associated with fare counter 127 is of the same color as the indicator lamp 139a, thereby providing an indication of what passenger's fare is being displayed.

Upon elapse of the ten seconds, a "1" signal appears at ring counter output R2 and remains for ten seconds, thereby connecting the second fare counter 128 to the converter 130 and display 131 and lighting the indicator lamp 139.

Upon elapse of another ten seconds, a "1" signal appears at the ring counter output R3, thereby connecting fare counter 129 to the converter 130 and display 131 and causing lamp 139c to repeat. This cycle is repeated over and over.

Next, assume that there are only two passengers riding, one associated with counter 127 and the other with counter 128. As just described, a "1" signal appears on ring counter output R1 and remains for 10 seconds, then a "1" signal appears on ring counter output R2 and remains for 10 seconds, then a "1" signal appears on ring counter output R3. However, R3 is associated with fare counter 129 and with switch $c$. Since switch $c$ is open, there is a "1" signal at the output of AND-gate 138; accordingly, when the "1" signal appears at R3, the "1" signal is immediately applied via OR-gate 134 to the input of ring counter 132, causing the "1" signal at R3 to almost immediately disappear, and causing a "1" signal to reappear at R1. The duration of the "1" signal at R3 is so short that the human eye cannot perceive the change in the display 131, and is so short that the indicator lamp 139c does not have time enought to light up. In other words, when only passengers A and B are riding, read-out of fare counter 129 is skipped, to avoid a 10 second dead time.

If another combination of two passengers is riding, the unused fare counter will not be read out, whether it is 127 or 128 or 129.

If only a single passenger is riding, then the remaining two unused fare counters will not be read out, the reading out being suppressed in substantially the same manner as just described. Instead, there will appear on the display 131 a four digit number which will seem to the human eye to be continuous.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a single taxi, an electronic taximeter comprising, in combination, fare computing means for separately computing the fares of a plurality of passengers whose respective trips overlap, said fare computing means including coordinating means activatable for initiating computation of the fare associated with a respective passenger when such passenger enters the taxi and activatable for terminating the computation of the respective fare when the respective passenger leaves the taxi; and fare display means connected to said fare computing means for displaying the computed fares associated with the respective passengers.

2. A taximeter as defined in claim 1, wherein said fare display means comprises a plurality of fare display devices and means for causing said plurality of fare display devices to simultaneously display the respective computed fares for said plurality of passengers.

3. A taximeter as defined in claim 1, wherein said fare display means comprises a single display device capable of displaying at any one time the fare for only one of said plurality of passengers, and selecting means connected both to said fare computing means and to said single display device and manually activatable by the taxi driver for causing said single display device to display the computed fare for any selected one of said plurality of passengers.

4. A taximeter as defined in claim 1, wherein said fare display means comprises a single display device capable of displaying at any one time the fare for only one of said plurality of passengers, and selecting means connected both to said fare computing means and to said single display device and for automatically causing said single display device to display in cyclical order successive ones of the fares being computed by said fare computing means.

5. A taximeter as defined in claim 1, and further including fare subtotal computing means for computing the total fare collected from a plurality of passengers during one trip and cumulative total fare computing means for computing the cumulative total of fares collected during a plurality of trips, and selector means connected to said fare subtotal computing means and to said cumulative total fare computing means and to said fare display means and for selectably causing said fare display means to display either the value computed by said fare subtotal computing means or the value computed by said cumulative total fare computing means.

6. A taximeter as defined in claim 1, wherein said fare computing means comprises means for determining the number of passengers riding concurrently at any time, and means for computing the fare for each passenger during each portion of the trip of such passenger at a first rate when such passenger rides alone during such portion, at a lower second rate when such passenger shares the taxi with one additional passenger during such portion, and at a third still lower rate when such passenger shares the taxi with two additional passengers during such portion.

7. A taximeter as defined in claim 1, wherein said fare computing means comprises means for determining the number of passengers riding concurrently at any time, and means for automatically computing the fare for each passenger during each portion of the trip of such passenger at a first rate when such passenger rides alone during such portion and at a lower rate when such passenger shares the taxi with one or more additional passengers during such portion.

8. A taximeter as defined in claim 1, wherein said fare computing means comprises means for determining the number of passengers riding concurrently at any time, and means for automatically changing the rate at which the fare for each passenger is computed during each portion of the trip of such passenger in dependence upon the number of passengers concurrently riding during each such portion of the trip.

9. A taximeter as defined in claim 8, wherein said fare computing means further includes means manually activatable to effect additional changes in the rate at which the fare for each passenger is computed, to permit the taxi driver or owner to employ different fare computation rates for day rides, night rides, holiday rides, and the like.

10. A taximeter as defined in claim 1, wherein said coordinating means comprises a plurality of coordination keys insertable into and withdrawable from respective keyholes in said taximeter and respectively corresponding to different passengers, and means for initiating the computation of the fare associated with a respective passenger when a respective one of said keys is withdrawn from the respective keyhole when the respective passenger enters the taxi and for terminating the computation of the respective fare when the respective key is reinserted into the respective keyhole when the respective passenger leaves the taxi.

11. A taximeter as defined in claim 10, wherein said coordination keys and said respective keyholes are complementarily configurated and wherein each coordination key has a different configuration, thereby preventing insertion of any one of said coordination keys into any but one associated keyhole.

12. A taximeter as defined in claim 10, wherein said fare computing means comprises a plurality of storage locations, and wherein said coordinating means further includes switch means controlled by said coordinating keys and encoding means connected to and controlled by said switch means and for addressing different ones of said storage locations in dependence upon the setting of said switch means.

* * * * *